No. 769,962. PATENTED SEPT. 13, 1904.
P. A. SAWYER.
SAFETY DEVICE FOR RAILWAYS.
APPLICATION FILED APR. 27, 1903.
NO MODEL. 2 SHEETS—SHEET 1.

Witnesses
Norris F. Clark
Richard H. Tucker

Inventor
P. A. Sawyer
By
Geo. P. Whittlesey
Att'y.

No. 769,962. PATENTED SEPT. 13, 1904.
P. A. SAWYER.
SAFETY DEVICE FOR RAILWAYS.
APPLICATION FILED APR. 27, 1903.
NO MODEL. 2 SHEETS—SHEET 2.
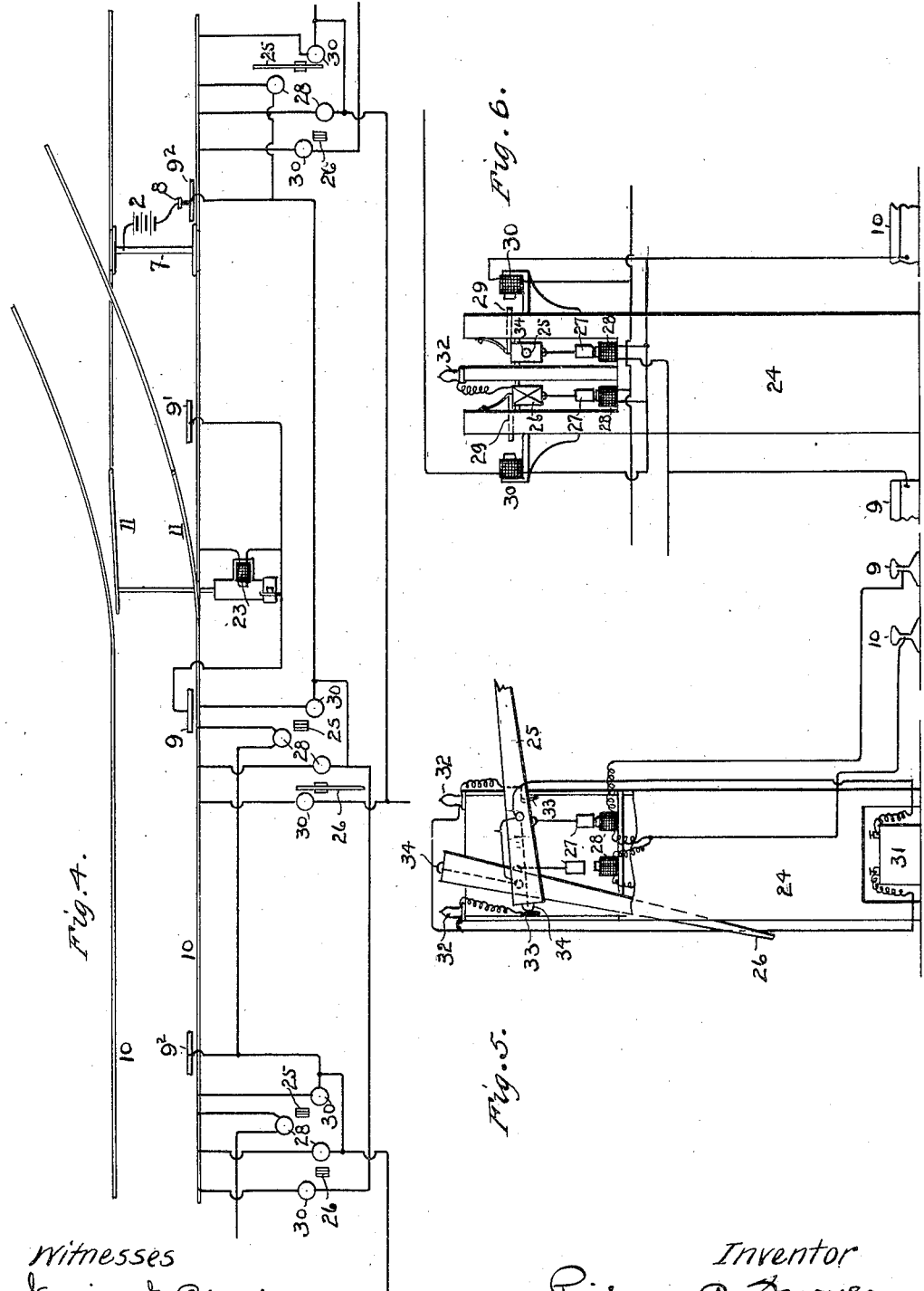
Witnesses
Inventor No. 769,962. Patented September 13, 1904.

UNITED STATES PATENT OFFICE.

PICKENS AUGUSTUS SAWYER, OF MEMPHIS, TENNESSEE.

SAFETY DEVICE FOR RAILWAYS.

SPECIFICATION forming part of Letters Patent No. 769,962, dated September 13, 1904.

Application filed April 27, 1903. Serial No. 154,559. (No model.)

*To all whom it may concern:*

Be it known that I, PICKENS AUGUSTUS SAWYER, a citizen of the United States, residing at Memphis, in the county of Shelby and State of Tennessee, have invented new and useful Improvements in Safety Devices for Railways, of which the following is a specification.

This invention relates to devices for insuring the safety of railway-trains; and it consists in a system of electric circuits whereby an engineer can cause the automatic throwing of a track-switch if improperly set and also set and release semaphores or light and extinguish lamps on signal-posts in front and in rear of a moving train. On the locomotive is a source of electric current, suitable circuit connections, a switch, and contact-brushes bearing on the track-rail and on a sectional third rail, whereby the engineer can energize stationary circuits along the road connected with the track and third rails and with the track-switches and signals.

Figure 1:
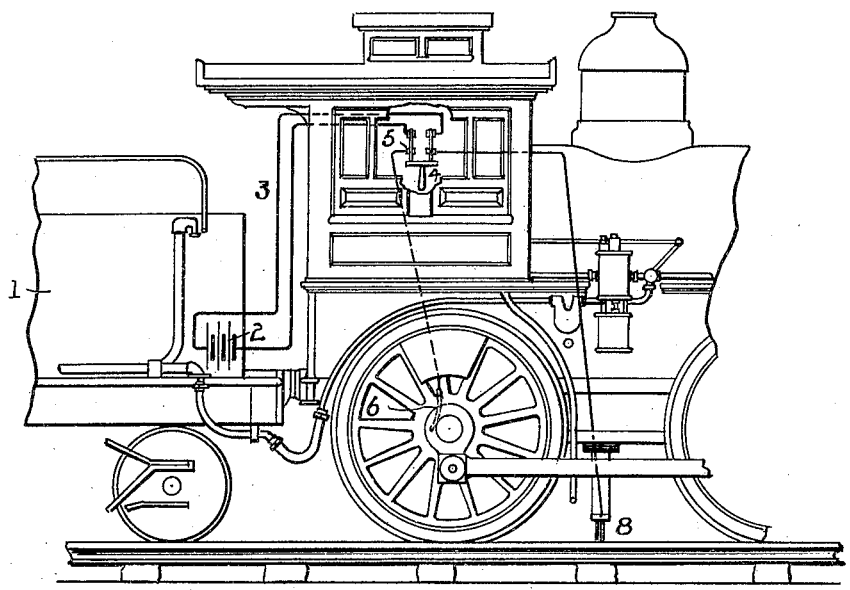
Figure 2:
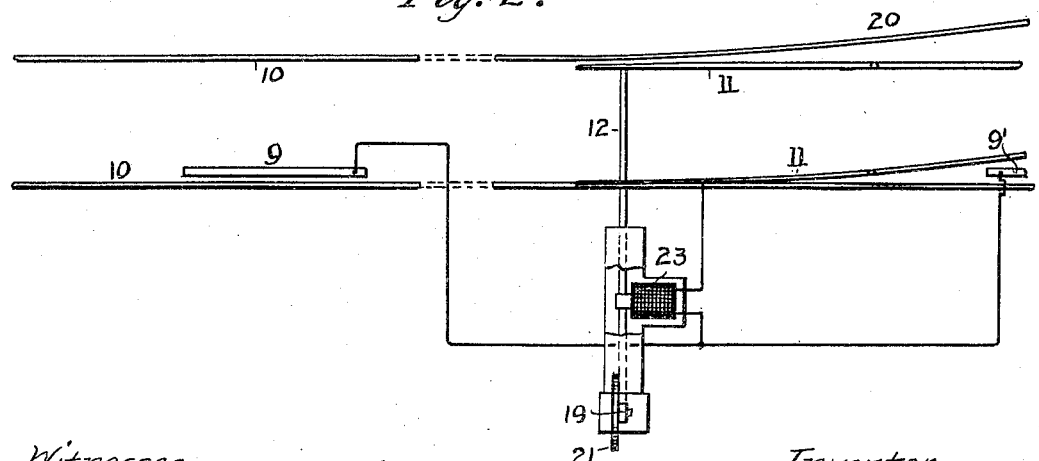
Figure 3:
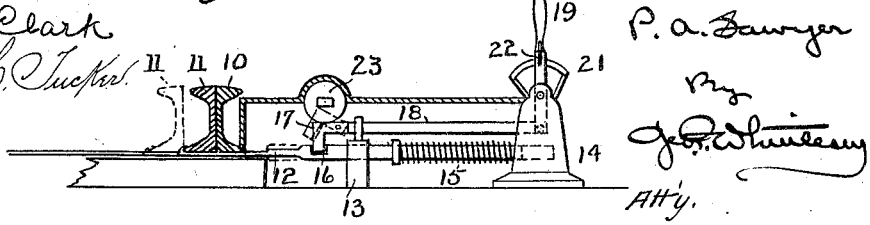

In the accompanying drawings, Figure 1 is a side elevation of a portion of a locomotive and tender equipped with the engineer's apparatus. Fig. 2 is a plan view of a track-switch and its electric actuating devices. Fig. 3 is a side elevation, partly in section, of the switch-operating mechanism. Fig. 4 is a diagram of the circuits for operating the track-switch and signals. Fig. 5 is a front elevation of one of the signal-posts, partly broken away. Fig. 6 is a side elevation of the same.

At some point convenient to the engineer, such as on the tender 1, is located a source of electric current, such as a storage battery 2, whose terminals are connected by wires 3 with a switch 4 on the locomotive. One of the switch-contacts 5 is connected with the track-rail through the wheels of the locomotive, preferably by means of a spring-contact 6, bearing against the main axle 7. The other switch-contact is connected with a brush 8, supported by but insulated from the frame of the locomotive and adapted to come in contact with a third rail 9, laid near to and parallel with the track-rail 10. The movable rails 11 of the track-switch are fastened to a bar 12, which slides in stationary guides 13 14. A helical spring 15 urges the bar toward the track, so as to keep the main line clear. In the top of the bar is a notch 16, with which can engage a hook 17, pivoted to the end of a rod 18, which can be moved lengthwise by a lever 19. When the hook is engaged with the notch and the lever is brought to an upright position, as shown in Fig. 3, the bar is retracted and the switch is thrown to connect the main line with the siding 20. A notched quadrant 21 and latch 22 on the lever enable the lever to be locked in this position against the tension of the spring. Just above the hook when it is in position is the core of a powerful electromagnet 23. When said magnet is energized, the hook is attracted thereby and lifted out of the notch 16, thus releasing the bar and permitting the spring 15 to throw the switch and clear the main line. The terminals of the electromagnet are connected, respectively, with the track-rail and the third rail. It is preferred to have two third rails 9 9' for each switch, located a short distance therefrom and on each side thereof.

The operation of these devices is as follows: If the engineer on approaching a switch sees that it is set for the siding and he wishes to proceed on the main track, he closes the switch 4 on his locomotive. As soon as the brush 8 touches the third rail 9' the circuit is completed from the storage battery through the electromagnet 23, which instantly lifts the hook 17 and permits the spring 15 to throw the track-switch over and clear the main line. If the locomotive is running backward, the third rail 9' enables the engineer to throw the track-switch if improperly set. In the same way by means of the battery and contact-brushes and the track and third rails the engineer can actuate signals arranged on posts 24 at suitable distances along the road. I prefer to provide each post with two semaphore-arms, one of which, 25, indicates "danger" and the other, 26, "caution." Each arm is pivoted near one end, being so proportioned or weighted as to turn very easily on its pivots, though standing normally at "safety." Attached to each arm is a metallic armature 27, coöperating with an electromagnet 28, which when energized is strong enough to attract said armature and throw up the arm. A spring-catch 29 locks the arm when raised, and adjacent to each catch is an electromagnet 30, which when energized retracts the catch and releases the arm, so that it will drop by gravity, the energizing of the lifting-magnet 28 having been but momentary. Taking any given section of third rail—such, for example, as the one at the right of Fig. 4—and tracing the circuits, it will be found that this section of rail is connected with the lifting-magnet 28 of the arm 25 on the post in front of it, with the releasing-magnet 30 for the arm 25 on the post immediately in the rear of it, with the lifting-magnet of the arm 26 on said post, and with the releasing-magnet 30 of the arm 26 on the second post in the rear. All these magnets are arranged in multiple, one terminal of each being connected with the track-rail. In addition to the semaphore-arms I prefer to provide lights on each post, one for each arm. In the base of the post is a battery 31, with one terminal of which the two lamps 32 are connected in multiple, the other terminals of said lamps being spring-contacts 33, secured to the post adjacent to the ends of the arms when raised. On each arm is a contact 34, connected with the other terminal of the battery, so that when either arm is raised its corresponding lamp will light up and show the appropriate color. The operation of this part of the invention is as follows: As the locomotive approaches the end of a block the engineer closes the switch 4, and as soon as the brush 8 touches the third rail $9^2$ the semaphore-arm 25 is raised on the post in front of the train, the corresponding arm is dropped on the post just behind the train and the cautionary arm 26 is raised on that post, and the cautionary arm is dropped on the second post in the rear of the train. In Fig. 4 the locomotive is shown diagrammatically as closing the circuit through the third rail at the right of the figure, and the arms are shown in the proper positions in plan view at each of the three posts indicated in the figure.

Having described my invention, I claim—

In a railway signaling system, the combination of a plurality of signaling-stations, each having independent danger and caution signals, of an electromagnet for setting each signal, a separate electromagnet for releasing each signal, a plurality of short insulated third rails, each connected to ground through the danger-signal-setting magnet at the station ahead, the danger-signal-releasing magnet and caution-signal-setting magnet at the station behind, and the caution-signal-releasing magnet at the second station in the rear, and a source of current carried on a railway-vehicle and having one terminal grounded and the other adapted to make contact with a third rail.

In testimony whereof I have signed my name to this specification in the presence of two subscribing witnesses.

PICKENS AUGUSTUS SAWYER.

Witnesses:
S. L. COCKROFT,
J. L. BEASLEY.